Aug. 5, 1924.  
C. J. AXTELL  
1,504,014
SYSTEM OF CONNECTIONS FOR PREVENTION OF PARALLELING
OF GENERATORS ON TRAIN UNITS
Filed Jan. 28, 1922
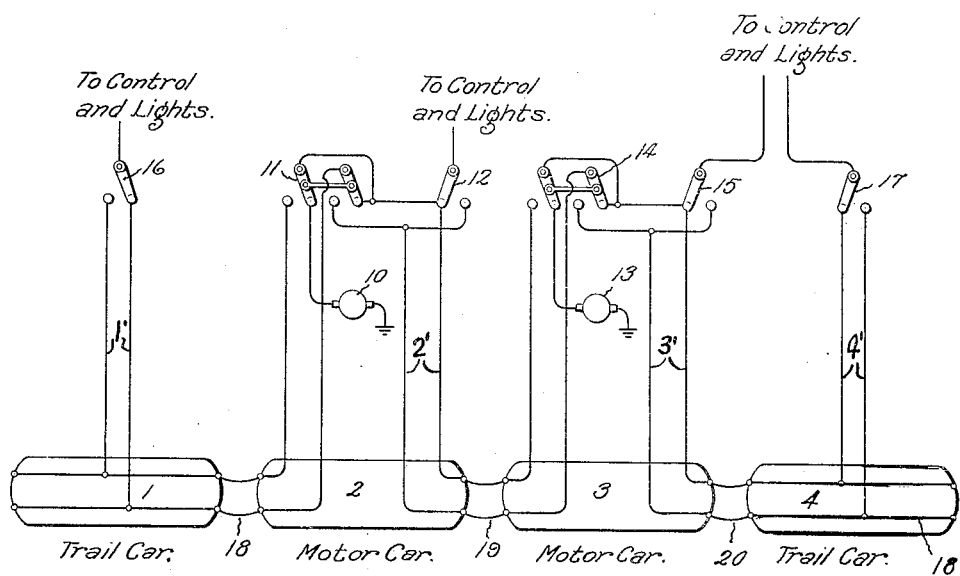
Inventor:
Clinton J. Axtell,
by Albert G. Davis
His Attorney Patented Aug. 5, 1924.

1,504,014

UNITED STATES PATENT OFFICE.

CLINTON J. AXTELL, OF SCHENECTADY, NEW YORK, ASSIGNOR TO GENERAL ELECTRIC COMPANY, A CORPORATION OF NEW YORK.

SYSTEM OF CONNECTIONS FOR PREVENTION OF PARALLELING OF GENERATORS ON TRAIN UNITS.

Application filed January 28, 1922. Serial No. 532,424.

*To all whom it may concern:*

Be it known that I, CLINTON J. AXTELL, a citizen of the United States, residing at Schenectady, in the county of Schenectady, State of New York, have invented certain new and useful Improvements in Systems of Connections for Prevention of Paralleling of Generators on Train Units, of which the following is a specification.

My invention relates to a system of connections for railway train units which are assembled indiscriminately to make up a train whereby the power for a translation circuit on a train unit may be obtained from the generator on that unit or from a generator on another train unit without paralleling any of the generators on the train units.

A train unit such as a motor operated vehicle is sometimes provided with a source of current supply such as a motor driven generator which is connected by suitable switches to supply the power to a translation circuit for operating the electromagnetic switches for controlling the train unit, the lighting of the train unit, and for other purposes. Trains are frequently made up with a part of the train units as trailers which are not equipped with driving motors and are not equipped with separate generators for supplying the control power for the respective trailers, so that the control power for the trailers must be taken from the train units equipped with generators. Difficulties are encountered in the prevention of the paralleling of the generators of the various train units, and one of the objects of my invention is to provide an improved system whereby the generators can not be paralleled no matter how the controlling switches on the various train units are operated. Those skilled in this art are familiar with the disadvantages of an arrangement in which the generators on the car units may be paralleled. Paralleling of the generators is objectionable because of the difficulties in properly distributing the loads of the generators, because of the fact that in case the supply of current to one train unit is interrupted the generator on that unit will operate as a motor being driven from the generator on the other units, and because of other well known reasons.

For a better understanding of the invention, reference is had to the accompanying drawing wherein I have shown in very simplified diagram a system of connections for the prevention of the paralleling of the generators on train units. Referring to the drawing, the train units 1, 2, 3, and 4 are each provided with a translating circuit marked "To control and lights" as shown and also carry a pair of power lines indicated respectively as 1', 2', 3', and 4'. A portion of the train units are driving units and the other are trailers. As shown the motor car 2 is provided with driving motors (not shown), and the generator 10 is provided on the train unit for the purpose of supplying the power for the control of and the lights of the train unit, and for others purposes. The arrangement is such that this generator may also supply the control power and lights of other train units through their respective power lines as well as to the motor car 2. The double-pole two-position disconnecting switch 11 is provided for connecting the generator 10 to supply power to its own train unit and other train units as may be selected, and for disconnecting the generator 10 so that the power for the train units may be supplied by the generator of another train unit. The switch 11 not only connects and disconnects the generator 10 but also serves in one position to sectionalize the power mains 2' and connect together transposed portions of each section, and in the other position to interconnect the respective sections. The single-pole two-position switch 12 is provided for selectively connecting the control and lighting circuits of the motor car 2 to one of the power lines 2' so that the power for this circuit is supplied from either the generator 10 or the generator of another train unit. The motor car 3 is also supplied with a similar generator 13, a double-pole two-position disconnecting switch 14 and a single-pole two-position control switch 15, all of which are similar to the corresponding switches of the motor car 2, and the connection of these switches is the same as that of motor car 2. In other words, the equipments on the motor cars 2 and 3 are substantially identical. A trail car 1, which is not provided with either driving motors or a generator for supplying the power for the control, lights, etc., of this trail car, is connected with the motor cars so as to receive energy therefrom. This trail car 1 is provided with a single-pole two-position switch 16 similar to the switches 12 and 15 for connecting the translation circuit on the trail car to be supplied with power from the generator on one of the train units having a generator. The trail car 4 is also supplied with a similar single-pole two-position switch 17. "Jumpers" 18, 19 and 20, each having two conductors, are of the usual type for preventing cross connections and are provided between the various train units so as to connect the electrical circuits of the train units together in a manner to be presently described.

It will be observed that one terminal of each generator is shown as grounded and it will be understood that one terminal of each control and light circuit is likewise grounded according to the well known practice in the railway art. By this arrangement the contacting metallic parts of the train units as well as the rails form a common conductor for the several circuits.

While I have shown an arrangement in the drawing in which there is first a trail car, then two motor cars, and then a trail car, I would have it understood that my invention is not necessarily limited to such an arrangement, but is also applicable to arrangements in which one or more trail cars are disposed between several motor cars or in any arrangement of the train units which may happen to occur when the train is made up. The equipment on each motor car and the equipment on each trail car, in so far as this invention is concerned, is identical with corresponding train units, so that no particular care need be taken in making up the train units. Thus, either end of a train unit may be connected with either end of another unit, and the units may be assembled in a train in any relation desired.

The circuit supplied with power on the various train units is indicated "To control and lights", and for the sake of brevity will be hereinafter referred to as the translation circuit. With the arrangement shown in the drawing, the generator 10 is connected to supply the translation circuit for motor car 2 and also the translation circuit for the trail car 1. The generator 13 is connected to supply the translation circuit for the motor car 3 and the trail car 4. If for any reason it should be desired to supply the translation circuits for all of the units from the generator 10, the disconnecting switch 14 will be thrown to its left hand position, thereby disconnecting the generator 13. The translation circuits of all of the units are thereby supplied from the generator 10 without any further manipulation of the switches. If it is desired to supply the translation circuits from the generator 13 alone, the switches on the motor car 3 will be thrown to their respective positions shown in the drawing if they are not already in those positions. The disconnecting switch 11 on the motor car 2 will be thrown so as to make engagement with its left-hand set of contacts, thereby disconnecting the generator 10 and connecting the translation circuit of the trail car 1 directly to the generator 13 to be supplied with power therefrom. In order to energize the control circuits of the motor car 2, the single-pole double-throw switch 12 will be moved to make engagement with its right hand contact, thereby energizing the translation circuit of the motor car 2 directly from the generator 13.

In order to connect all of the translation circuits of the various train units so as to be energized from the generator of another train unit (not shown), as for example, a generator on a car to the right of trail car 4, the disconnecting switches 11 and 14 will be both thrown to their left hand positions, the switches 12, 15 and 17 will be thrown to their respective right hand positions, and all of the translation circuit power for the various train units will be received through the conductor 18 from the generator on a motor car located to the right of the trail car 4 and not shown in the drawing.

It will be observed that the connections of each train unit and the connections between the train units are such that no matter how the various switches are thrown, the generators on the various motor cars cannot be connected in parallel.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. The combination with a plurality of train units of a translation circuit for each of said units, a generator carried by each of said units, selective switch mechanism on each unit for connecting the translation circuit on that unit to be supplied with power from the generator on the corresponding unit or from the generator on another unit, mechanically independent switch mechanism for disconnecting the generator on any unit and connecting the translation circuit or circuits supplied by said generator to be supplied with power from another unit, and electrical connections between the said units controlled by the said switch mechanisms whereby the generators on the train units can not be paralleled irrespective of the operation of the said switch mechanisms.

2. The combination with a plurality of train units of a translation circuit for each of said units, a generator carried by each of said units, selective switch mechanism having a plurality of operative positions for connecting the translation circuit of any unit to be supplied with power from the generator on the corresponding unit or from the generator on another unit, mechanically independent switch mechanism having a plurality of operative positions carried by each of said units for disconnecting the generator on the corresponding unit and connecting the selected translation circuit or circuits supplied thereby to be supplied with power from any other unit, and electrical connections between the said units controlled by the said switch mechanisms whereby the generators on the train units cannot be paralleled irrespective of the operation of the said switch mechanisms.

3. The combination with a plurality of train units of a translation circuit for each of said units, a portion only, comprising a plurality of the said units, having each a generator, selective switch mechanism for connecting the translation circuit on any unit to be supplied with power from any one of the said generators, mechanically independent switch mechanism for disconnecting the generator on any unit and connecting the translation circuit or circuits supplied thereby to be supplied with power from another unit, and electrical connections between the said units controlled by the said switch mechanisms whereby the generators on the train units cannot be paralleled irrespective of the operation of the said switch mechanisms.

4. The combination with a plurality of train units of a translation circuit for each of said units, a plurality of said units having each a generator, a portion of the units not being so equipped, selective switch mechanism carried by each unit for connecting the translation circuit on that unit to be supplied with power from the generator on any unit, mechanically independent, switch mechanism carried by each of the said units having a generator for disconnecting the generator on that unit and connecting the translation circuit supplied thereby to be supplied with power from another unit, and electrical connections between the said units controlled by the said switch mechanisms whereby the generators on the train units cannot be paralleled irrespective of the operation of the said switch mechanisms.

5. The combination with a plurality of generators and a plurality of translating circuits, each generator and each circuit having one terminal connected to a common conductor, of a plurality of two position switch mechanisms, and electrical connections controlled by said mechanisms for connecting the other terminal of any selected generator to the other terminal or terminals of any selected circuit or circuits and preventing paralleling the generators irrespective of the operation of said switch mechanisms.

6. The combination with a plurality of generators and a plurality of translating circuits, each generator and each circuit having one terminal connected to a common conductor, of a single blade two position switch for each of said circuits and a double blade two position switch for each of said generators, and electrical connections controlled by said switches for connecting the other terminal of any selected generator to the other terminal or terminals of any selected circuit or circuits and preventing paralleling the generators irrespective of the operation of said switches.

7. The combination with a plurality of train units, indiscriminately assembled to make up a train and each provided with a translating circuit, a plurality of power lines, and switch mechanism for selectively connecting the said circuit to any one of the said lines, a portion of said units having each a generator and additional switch mechanism operable to one position for sectionalizing the power lines on that unit and connecting the generator to a transposed portion of each section and to a second position for disconnecting the generator and interconnecting the respective sections of the power lines, and electrical connections between the power lines of the said units whereby the translation circuit on any unit may be supplied with power from any generator and the generators cannot be paralleled irrespective of the operation of the said switch mechanism.

8. The combination with a plurality of train units indiscriminately assembled to make up a train and each provided with a translating circuit, a plurality of power lines, and switch mechanism for selectively connecting the said circuit to any one of the said lines, a portion of said units having each a generator and additional switch mechanism and electrical connections for sectionalizing the power lines on that unit and connecting the generator to a transposed portion of each section and for disconnecting the generator and interconnecting the respective sections of the power lines, and means for interconnecting the power lines of adjacent units whereby the translation circuit on any unit may be supplied with power from any generator and the generators cannot be paralleled irrespective of the operation of the said switch mechanism.

9. The combination with a plurality of train units indiscriminately assembled to make up a train and each provided with a translating circuit, a plurality of power lines, and switch mechanism for selectively connecting the said circuit to any one of the said lines, a portion of said units having each a generator and additional switch mechanism operable to one position for sectionalizing the power lines on that unit and connecting the generator to a transposed portion of each section and to a second position for disconnecting the generator and interconnecting the respective sections of the power lines, and electrical connections including two conductor jumpers between the power lines of the said units whereby the translation circuit on any unit may be supplied with power from any generator and the generators cannot be paralleled irrespective of the operation of the said switch mechanisms.

In witness whereof I have hereunto set my hand this 27th day of January, 1922.

CLINTON J. AXTELL.